(12) United States Patent
Chauvet et al.

(10) Patent No.: US 9,652,479 B2
(45) Date of Patent: *May 16, 2017

(54) RECOVERING FROM A PENDING UNCOMPLETED REORGANIZATION OF A DATA SET

(71) Applicant: International Business Machines Corporation, Armonk, NY (US)

(72) Inventors: Philip R. Chauvet, Tucson, AZ (US); Charles J. House, Tucson, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,621

(22) Filed: Feb. 18, 2016

(65) Prior Publication Data
US 2016/0171021 A1    Jun. 16, 2016

Related U.S. Application Data

(63) Continuation of application No. 13/944,804, filed on Jul. 17, 2013, now Pat. No. 9,298,387.

(51) Int. Cl.
*G06F 17/30* (2006.01)
*G06F 3/06* (2006.01)

(52) U.S. Cl.
CPC ........ *G06F 17/30303* (2013.01); *G06F 3/061* (2013.01); *G06F 3/0643* (2013.01); *G06F 3/0689* (2013.01); *G06F 17/30171* (2013.01)

(58) Field of Classification Search
CPC ......... G06F 17/30156; G06F 17/30303; G06F 17/30171; G06F 3/0643; G06F 3/061; G06F 3/0689
USPC .................................................. 707/692, 704
See application file for complete search history.

(56) References Cited

U.S. PATENT DOCUMENTS

| | | |
|---|---|---|
| 6,460,048 B1 * | 10/2002 | Teng et al. |
| 7,158,999 B2 | 1/2007 | Pace et al. |
| 7,447,717 B2 | 11/2008 | Bower et al. |
| 2013/0007292 A1 | 1/2013 | Reed et al. |
| 2015/0026137 A1 | 1/2015 | Chauvet et al. |

OTHER PUBLICATIONS

Sockut et al., Database Reorganization—Principles and Practice, Dec. 1979, ACM, 25 pages.*
Sockut, et al., "Database-Reorganization Principles and Practice", Dec. 1974, ACM, vol. 11, pp. 25.

(Continued)

*Primary Examiner* — Jean B Fleurantin
(74) *Attorney, Agent, or Firm* — David W. Victor; Konrad Raynes Davda & Victor LLP (57) ABSTRACT

Provided are a computer program product, system, and method for recovering from a pending uncompleted reorganization of a data set managing data sets in a storage. In response an initiation of an operation to access a data set, an operation is initiated to complete a pending uncompleted reorganization of the data set in response to the data set being in a pending uncompleted reorganization state and no other process currently accessing the data set.

17 Claims, 5 Drawing Sheets

(56) References Cited

OTHER PUBLICATIONS

Office Action dated Jun. 30, 2015, pp. 11, for U.S. Appl. No. 13/944,804, filed Jul. 17, 2013.
Response dated Sep. 3, 2015, pp. 18, to Office Action dated Jun. 30, 2015, pp. 11, for U.S. Appl. No. 13/944,804, filed Jul. 17, 2013.
Notice of Allowance dated Dec. 16, 2015, pp. 14, for U.S. Appl. No. 13/944,804, filed Jul. 17, 2013.

* cited by examiner

RECOVERING FROM A PENDING UNCOMPLETED REORGANIZATION OF A DATA SET

CROSS-REFERENCE TO RELATED APPLICATION

This application is a continuation of U.S. patent application No. 13/944,804, filed Jul. 17, 2013, which application is incorporated herein by reference in its entirety.

BACKGROUND OF THE INVENTION

1. Field of the Invention

The present invention relates to a computer program product, system, and method for recovering from a pending uncompleted reorganization of a data set.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage. For Virtual Storage Access Method (VSAM) data sets, the z/OS operating system provides VSAM volume data sets (VVDS) stored in a data set to provide information on VSM key sequenced data sets. (Z/OS is a registered trademark of IBM in the United States and other countries)

Data sets may be reorganized to improve the access performance of the data set when over time the data or records in the data set are rearranged to be in a less than optimal access state. Data reorganization may order the records or data in the data set according to an index key or other ordering to improve user access performance. When proper procedures are not followed during the data reorganization, data integrity problems may result in outages and data loss. For instance, during reorganization, no other client is supposed to access the data set and modify the data. However, not all clients will follow serialization, which may result in corrupted data. If a reorganization fails, then applications will have to continue operating on the data set whose data is not arranged in an ordering that optimizes access.

SUMMARY

Provided are a computer program product, system, and method for recovering from a pending uncompleted reorganization of a data set managing data sets in a storage. In response an initiation of an operation to access a data set, an operation is initiated to complete a pending uncompleted reorganization of the data set in response to the data set being in a pending uncompleted reorganization state and no other process currently accessing the data set.

DETAILED DESCRIPTION

Described embodiments provide techniques for initiating an operation to complete a pending uncompleted reorganization of the data set when performing an operation with respect to a data set, such as an open or access operation, in response to the data set being in a pending uncompleted reorganization state and no other process currently accessing the data set. With described embodiments, a reorganization process may set certain information, such as a flag, during the reorganization process so that if a reorganization is interrupted or fails, a subsequent processing attempting to access the data set may then invoke an operation to complete the interrupted reorganization operation so that the current and subsequent processes will access a reorganized data set.

Figure 1:
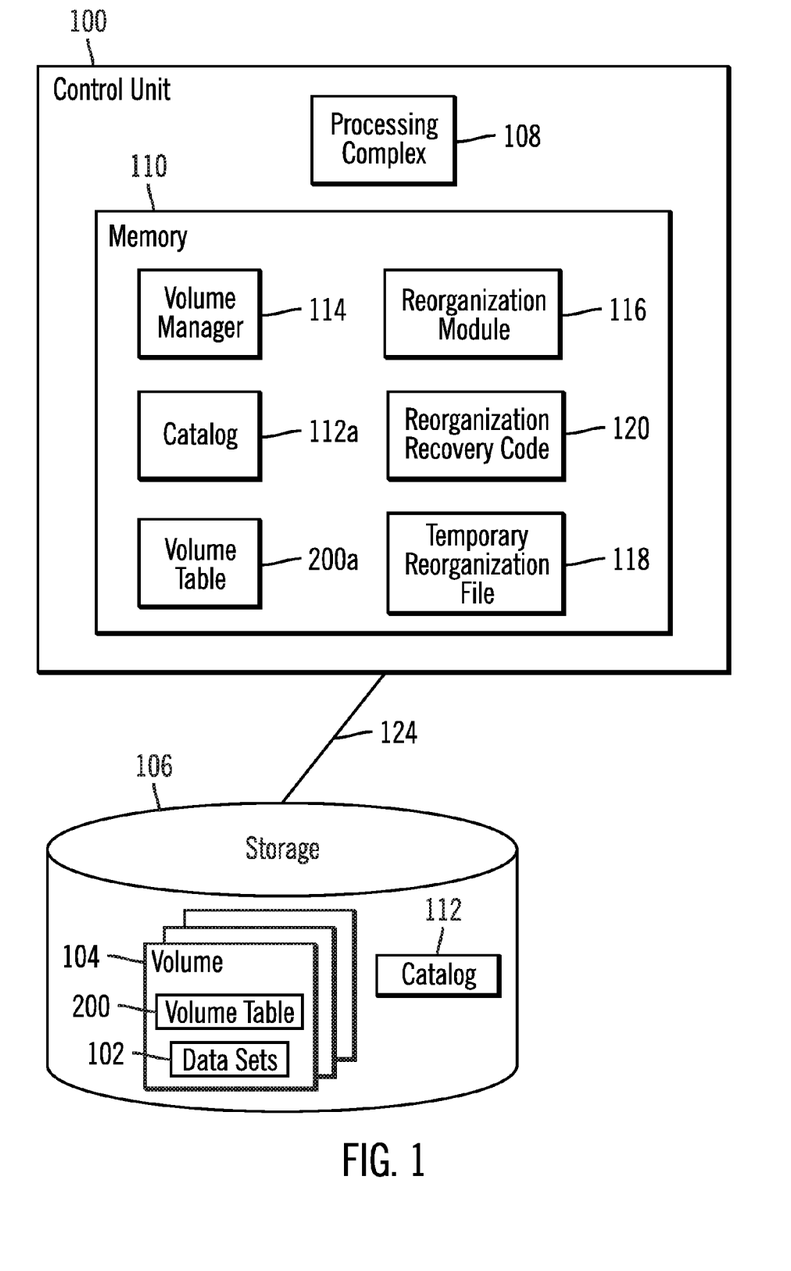
FIG. 1 illustrates an embodiment of a computing environment.

FIG. 1 illustrates an embodiment of a computing environment. Control unit 100, such as a storage controller or server, manages access to data sets 102 in volumes 104 in a storage 106 from hosts (not shown). The controller 100 includes a processing complex 108 comprising one or more processors, each including one or more processing cores, and a memory 110 storing various program modules executed by the processor 108 and data structures used for managing the data sets 102.

A catalog 112, stored in the storage 106 and loaded into the control unit 100 memory 110 as catalog 112a, provides information on the data sets 102 stored in volumes 104 configured in storage space in the storage 106. A data set 102 comprises a collection of data intended to be stored in a same logical allocation of data, such as data from a single application, user, enterprise, etc. A data set 102 may be comprised of separate files or records, or comprise a single file or record. The data sets 102 may comprise indexed data sets that are indexed according to a primary key that is used to locate records in the data set 102. Data set indexes provide an index for each indexed data set 102. For instance, in IBM z/OS DFSMS implementations, the data set may comprise a Key Sequenced Data Set (KSDS) used in the IBM Virtual Storage Access Method (VSAM) storage, where each record in the KSDS data set has a unique key used to locate the record in the data set 102.

The control unit 100 includes a volume manager 114 to manage the storage of and access to data sets 102 in the volumes 104. The control unit 100 also includes a reorganization module 116 to perform a reorganization of the data sets 102 that reorganizes the data sets 102 by reordering the data sets according to a key value. For instance, if the data sets 102 comprise VSAM data sets, then the reorganization module 116 reorganizes the data sets by ordering the records in the data set according to an index key. The reorganization module 116 reorganizes the data sets by exporting or writing the data in a data set 102 to a temporary reorganization file 118 according to an ordering, such as a sequential ordering based on an index key value for the records, and then rewrites the ordered records of the data set 102 in the temporary reorganization file 118 back to the data set 102 from whence they came.

The control unit 100 further includes reorganization recovery code 120 that is invoked to complete a pending uncompleted reorganization operation that was interrupted or failed. In one embodiment, the reorganization recovery code 120 may be invoked by the volume manager 114 when processing a command to access or open a data set 112 that is in a pending uncompleted reorganization state indicating that a reorganization operation against the data set 102 was interrupted before completion.

Figure 2:
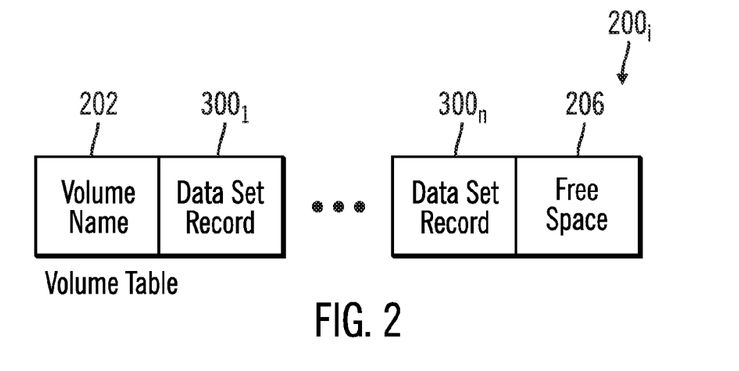
FIG. 2 illustrates an embodiment of a volume table.

Each volume 104 includes a volume table 200 having information on the volume 104 to which it pertains, including a mapping of tracks and extents of tracks to data sets 4. The volume table 200 may be stored in the volume 104, such as in the first few records of the volume, as in the case of a volume table of contents (VTOC), or may be stored as metadata external to the volume 104. The control unit 100 may maintain copies of the volume tables 200a to use to manage the data sets 102 in the volumes 104. In z/OS implementations, the volume table 200 may include information on a location of data sets in the volume 104, such as a mapping of extents in the data set to storage locations in the volume. In alternative embodiments, the volume table 200 may comprise other types of file allocation data structures that provide a mapping of data to storage locations, either logical and/or physical storage locations. In this way, the volume table 200 provides a mapping of the data to data sets 102 in the volume 104. The volume table 200 may include volume table records for each volume 104, including a volume name and data set records indicating data sets having extents configured in the volume 104. Each data set record may have information for each data set 102 in a volume 104, including the one or more extents assigned to the data set 102. The extents provide a mapping to tracks in the volume 104.

Although the program components 114, 116, and 120 are shown as separate components, the operations described with respect to these components may be combined in one or more modules than shown. Further the components 114, 116, 120 may be implemented as program code executed by the processing complex 108 or may be implemented in part or whole in hardware devices.

The storage 106 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The control unit 100 communicates with the storage 106 via connection 124. The connection 124 may comprise one or more networks, such as a Local Area Network (LAN), Storage Area Network (SAN), Wide Area Network (WAN), peer-to-peer network, wireless network, etc. Alternatively, the connection 124 may comprise bus interfaces, such as a Peripheral Component Interconnect (PCI) bus or serial interface. The control unit 100 may further include an operating system such as the International Business Machines ("IBM®") z/OS® operating system. (IBM and z/OS are trademarks of IBM in the United States and foreign countries).

FIG. 2 illustrates an arrangement of information maintained in an instance of a volume table 200, for one volume 104. The volume table instance 200, includes a volume name 202, also known as a volume serial number, e.g., a VOL-SER, that provides a unique identifier of the volume. The volume name 202 may be included in the name of the volume table 200, in the volume 104. The volume table $200_i$ instance further includes one or more data set records $300_1 \ldots 300_n$ indicating data sets 102 having extents configured in the volume 106 represented by the volume table $200_i$. The volume table 200, further includes one or more free space records 206 identifying ranges of available tracks in the volume 106.

Figure 3:
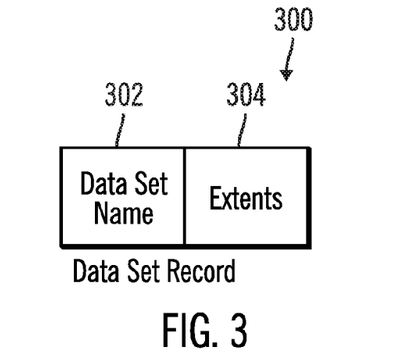
FIG. 3 illustrates an embodiment of a data set record.

FIG. 3 illustrates an embodiment of a data set record 300, such as the data set records $300_1 \ldots 300_n$ included in the volume table $200_i$. Each data set record 300 includes a data set name 302 and one or more extents 304 allocated to the data set 300. Each extent 304 provides a mapping to tracks in the volume 104 identified by the volume table 202. The tracks indicated in the map may be expressed as disk, cylinder, head and record location (CCHHR).

The reference numeral "n" used herein may refer to any number of instances of an element to which it is attached, and may refer to the same or different number of instances when used with different elements.

Figure 4:
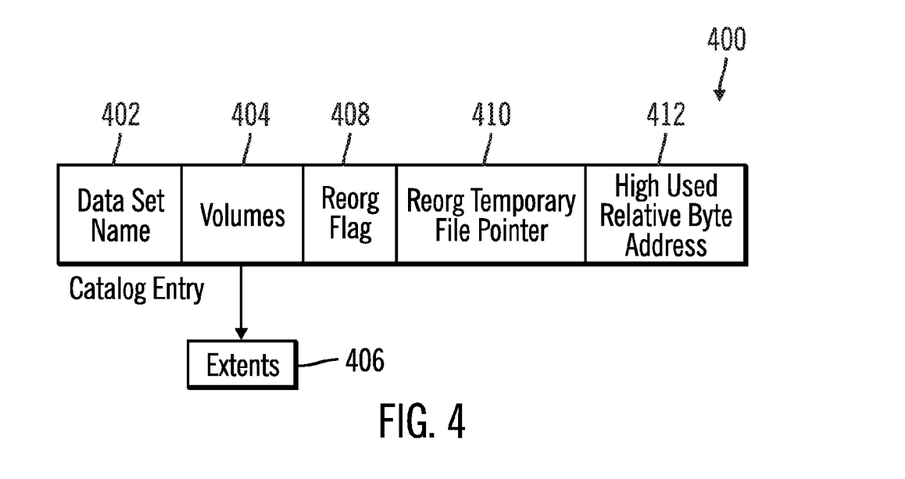
FIG. 4 illustrates an embodiment of a catalog entry.

The data set catalog 112 provides information on data sets 102 having extents in one or more volumes 104. FIG. 4 illustrates an embodiment of a catalog entry 400 in the catalog 112, 112, including a data set name 402 and one or more volumes 404 in which the data set 402 is allocated space. The volumes 404 may be listed in the order in which extents from the volume are assigned to the data set 402, and indicate base volume names or alias volume names. Each volume 404 would identity extents 406 in the volume that are assigned to the data set 402. The extents 406 for one volume 404 may be listed in the order in which they are allocated to the data set 402. The catalog 112 may be organized by a key comprising the data set name to allow searching on the data set name to obtain the catalog entry 400 for a data set name. The catalog entry 400 for a data set 402 may further include a reorganization ("reorg") flag 408 indicating whether the data set 402 is in a pending uncompleted reorganization state such that a reorganization operation started against the data set 402 and has not completed or may indicate that there is no pending uncompleted reorganization operation against the data set 402. The catalog entry 400 may further include a reorganization ("reorg") temporary file pointer 410 identifying the temporary reorganization file 118 to which the data records in the data set 402 are copied during the reorganization, such as copied in a sequential ordering according to their index key. The catalog entry 440 may also include a high used relative byte address 412 indicating the last address written to in the data set 402, such that a high used relative byte address 412 of zero indicates the data set 402 is empty. The data set 402 must be initially loaded to set the high used relative byte address 412 to a value other than zero.

When creating a data set 102, the host or control unit 100 may create an entry 400 in the catalog 112. The host may then locate a first volume and assign extents to the volume, and indicate the allocated extent 406 in the catalog entry 400 for the created data set 102.

Figure 5:
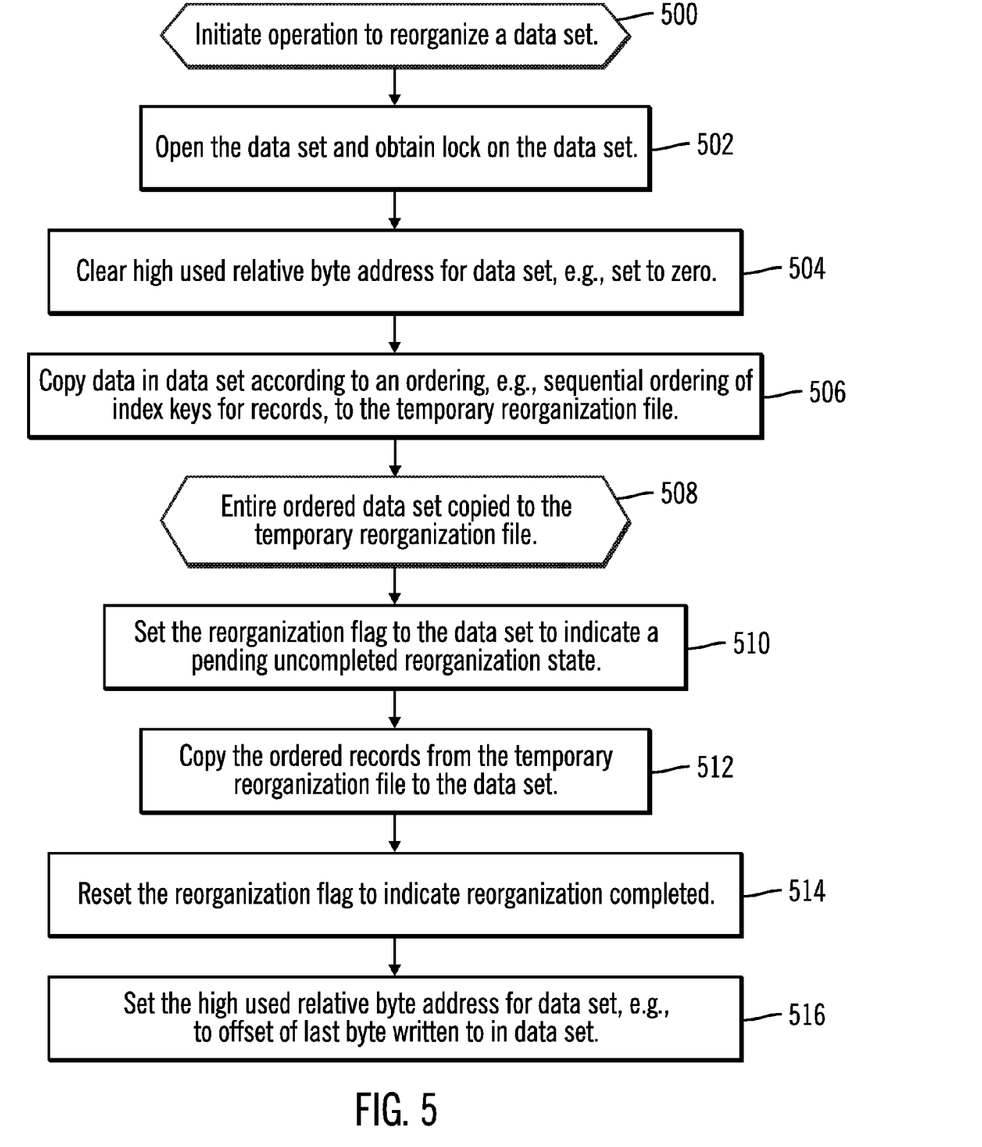
FIG. 5 illustrates an embodiment of operations to perform a reorganization of a data set.

FIG. 5 illustrates an embodiment of operations performed by the reorganization module 116 to reorganize a data set 102. Upon initiating (at block 500) an operation to reorganize a data set 102, the reorganization module 116 opens (at block 502) the data set 102 and obtains a lock on the data set 102. In one embodiment, the lock may comprise an exclusive lock, such as a SYSDSN ENQ type lock used to serialize access to a data set 102. The reorganization module 116 may then clear (at block 504) the high used relative byte address ("HURBA") 412 in the catalog entry 400 for the data set 102. For instance, the HURBA 412 may be set to zero to indicate that the data set 102 is not loaded or has no records. The data in the data set 102, such as records or extents, are copied (at block 506) to the temporary reorganization file 118 according to an ordering, such as a sequential ordering of the index keys for the data records, so that in the temporary reorganization file 118, the data set records or data units are ordered according to a key value. When the entire ordered data set 102 data is copied to the temporary organization file 118 (at block 508), the reorganization module 116 sets (at block 510) the reorg flag 408 to indicate a pending uncompleted reorganization state for the data set 102. The ordered records in the temporary reorganization file 118 are then copied (at block 512) back to the data set 102 to be in the ordering used to order the data set record or data units in the temporary reorganization file 118, such as a key index value for the records. Once the reordered data is copied back to the data set 102, the reorg flag 408 is reset (at block 514) to indicate that the reorganization completed or that there is no pending uncompleted reorganization for the data set. The HURBA 412 may then be set (at block 516) to an offset of the last written byte in the data set 102.

During the reorganization operations of FIG. 5, the reorganization may fail or be interrupted such that the reorganization did not complete in a state leaving the reorg flag 408 set to indicate a pending uncompleted reorganization.

Figure 6:
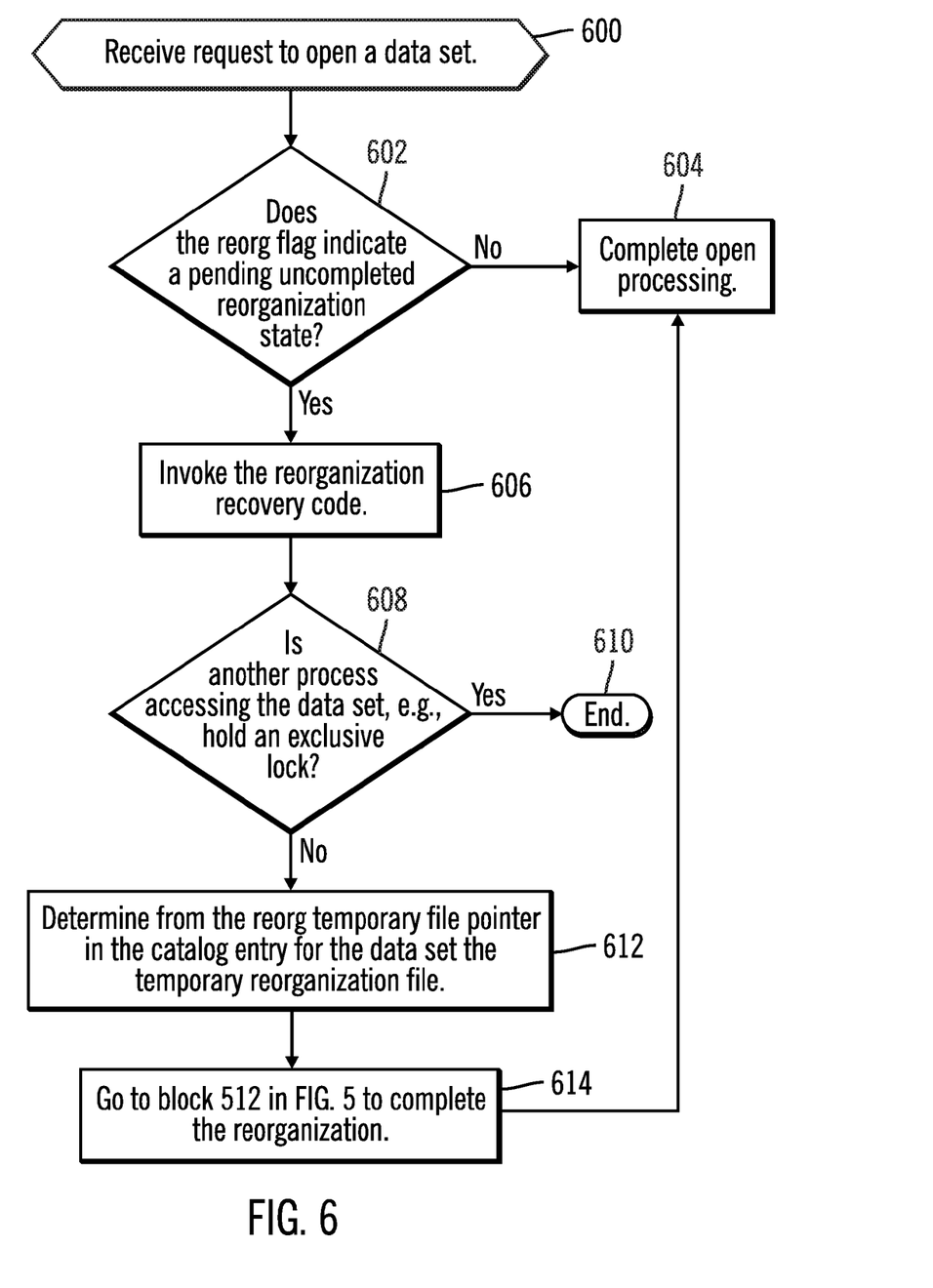
FIG. 6 illustrates an embodiment of operations to recover from a reorganization failure during a data set operation.

FIG. 6 illustrates an embodiment of operations performed by the volume manager 114 to process an operation on a data set, such as an open command or other operation, and invoke the reorganization recovery code 120 if the data set is in a pending uncompleted reorganization state in order to complete the uncompleted reorganization. Control begins with the volume manager 114 receiving (at block 600) a request to open the data set 102, or another type of access request for the data set. If (at block 602) the reorg flag 408 indicates the data set is not in the pending uncompleted reorganization state, then control proceeds to block 604 where the volume manager 114 completes the open operation for the requesting host or process. If (at block 602) the reorg flag 408 indicates the data set is in the pending uncompleted reorganization state, then the volume manager 114 invokes (at block 606) the reorganization recovery code 120 to complete the uncompleted reorganization by performing the operations at blocks 608 through 614.

If (at block 608) another process is accessing the data set, e.g., holding an exclusive lock on the data set 102, then control ends to retry the open operation after the lock is released because the current process holding the lock may be performing the reorganization process of FIG. 5. If (at block 608) no other process is accessing the data set, e.g., holding the lock, and the reorg flag 408 indicates the pending uncompleted reorganization state, then the process that was performing the reorganization may have been interrupted and failed after setting the reorg flag 408 but before completing the reorganization. In such case, the reorganization recovery code 120 determines (at block 612) from the reorg temporary file pointer 410 in the catalog entry 400 for the data set the location of the temporary reorganization file 118. Control then proceeds to block 506 in FIG. 5 to copy the data from the temporary reorganization file 118 back to the data set 102 to complete the reorganization with respect to the data set to open/access.

With the described embodiments, a reorganization process sets information, such as a flag, after completing certain reorganization steps, such as copying all the data to the temporary reorganization file 118 or other steps, to indicate that a reorganization is in progress. This way, if the reorganization is interrupted after setting the information, e.g., the reorg flag 408, but before completing, a later process, such as a data set open process, can determine that the data set it is operating on has not yet completed and perform a recovery of the reconfiguration operation before proceeding with the requested data set open or other operation.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 7:
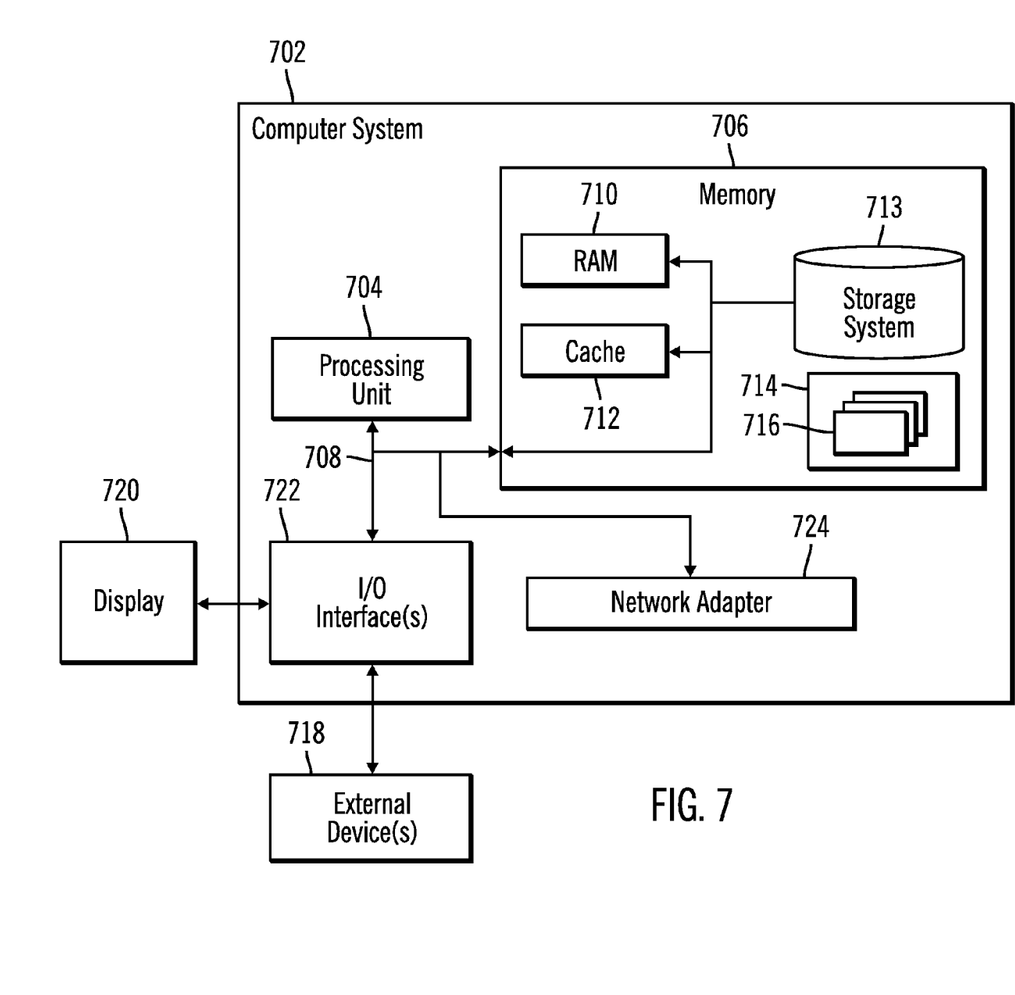
FIG. 7 illustrates a computing environment in which embodiments may be implemented.

The control unit 100 and components therein, may be implemented in one or more computer systems, such as the computer system 702 shown in FIG. 7. If the components of the network computing environment of FIG. 1 are implemented in multiple systems, then the systems may communicate over the network 124. Computer system/server 702 may be described in the general context of computer system executable instructions, such as program modules, being executed by a computer system. Generally, program modules may include routines, programs, objects, components, logic, data structures, and so on that perform particular resources or implement particular abstract data types. Computer system/server 702 may be practiced in distributed cloud computing environments where resources are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 716 which generally carry out the functions and/or methodologies of embodiments of the invention as described herein.

Computer system/server 702 may also communicate with one or more external devices 718 such as a keyboard, a pointing device, a display 720, etc.; one or more devices that enable a user to interact with computer system/server 12; and/or any devices (e.g., network card, modem, etc.) that enable computer system/server 702 to communicate with one or more other computing devices. Such communication can occur via Input/output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data sets in a storage device, the computer program product comprising a computer readable storage medium including hardware having computer readable program code embodied therein that executes to perform operations, the operations comprising:
    performing a reorganization of a data set in the storage device;
    determining whether a reorganization flag indicates a pending uncompleted reorganization state, wherein the data set is in the pending uncompleted reorganization state if the reorganization started against the data set and was interrupted and did not complete; and
    in response to an access request for the data set and determining that the reorganization flag indicates the pending uncompleted reorganization state and that no other process is currently accessing the data set, initiating to complete the reorganization of the data set in the storage device.

2. The computer program product of claim 1, wherein the reorganization flag is set to indicate the pending uncompleted reorganization state during the reorganization.

3. The computer program product of claim 1, wherein the reorganization is performed by writing data from the data set to a temporary file to be written back to the data set according to an ordering, wherein the reorganization flag is set to indicate the pending uncompleted reorganization state in response to writing the data from the data set to the temporary file during the reorganization.

4. The computer program product of claim 3, wherein the reorganization flag is set to indicate no pending uncompleted reorganization state in response to copying of the data from the temporary file back to the data set.

5. The computer program product of claim 1, wherein the reorganization is performed by writing data from the data set to a temporary file to write back to the data set according to an ordering, wherein the completing the reorganization comprises:
    determining a location of the temporary file; and
    writing the data in the temporary file to the data set.

6. The computer program product of claim 5, wherein the location of the temporary file is indicated in data set record information for the data set as part of the reorganization.

7. The computer program product of claim 1, wherein an exclusive lock is held against the data set if another process is accessing the data set to perform the reorganization of the data set, wherein the operations further comprise:
    in response to the access request, waiting for the reorganization of the data set to complete in response to the data set being in the pending uncompleted reorganization state and one other process currently holding the exclusive lock to the data set before completing the access request.

8. A system for managing data sets in a storage device comprising: a processor;
    a non-statutory computer readable storage medium having computer readable program code embodied therein executable by the processor to perform operations, the operations comprising:
    performing a reorganization of a data set in the storage device;
    determining whether a reorganization flag indicates a pending uncompleted reorganization state, wherein the data set is in a pending uncompleted reorganization state if the reorganization started against the data set and was interrupted and did not complete; and in response to an access request for the data set and determining that the reorganization flag indicates the pending uncompleted reorganization state and that no other process is currently accessing the data set, initiating to complete the reorganization of the data set in the storage device.

9. The system of claim 8, wherein the reorganization is performed by writing data from the data set to a temporary file to be written back to the data set according to an ordering, wherein the reorganization flag is set to indicate the pending uncompleted reorganization state in response to writing the data from the data set to the temporary file during the reorganization.

10. The system of claim 9, wherein the reorganization flag is set to indicate no pending uncompleted reorganization state in response to copying of the data from the temporary file back to the data set.

11. The system of claim 8, wherein the reorganization is performed by writing data from the data set to a temporary file to write back to the data set according to an ordering, wherein the completing the reorganization comprises:
 determining a location of the temporary file; and
 writing the data in the temporary file to the data set.

12. The system of claim 8, wherein an exclusive lock is held against the data set if another process is accessing the data set to perform the reorganization of the data set, wherein the operations further comprise:
 in response to the access request, waiting for the reorganization of the data set to complete in response to the data set being in the pending uncompleted reorganization state and one other process currently holding the exclusive lock to the data set before completing the access request.

13. A method for managing data sets in a storage device, comprising: performing a reorganization of a data set in the storage device;
 determining whether a reorganization flag indicates a pending uncompleted reorganization state, wherein the data set is in the pending uncompleted reorganization state if the reorganization started against the data set and was interrupted and did not complete; and
 in response to an access request for the data set and determining that the reorganization flag indicates the pending uncompleted reorganization state and that no other process is currently accessing the data set, initiating to complete the reorganization of the data set in the storage device.

14. The method of claim 13, wherein the reorganization is performed by writing data from the data set to a temporary file to be written back to the data set according to an ordering, wherein the reorganization flag is set to indicate the pending uncompleted reorganization state in response to writing the data from the data set to the temporary file during the reorganization.

15. The method of claim 14, wherein the reorganization flag is set to indicate no pending uncompleted reorganization state in response to copying of the data from the temporary file back to the data set.

16. The method of claim 13, wherein the reorganization is performed by writing data from the data set to a temporary file to write back to the data set according to an ordering, wherein the completing the reorganization of the data set comprises:
 determining a location of the temporary file; and
 writing the data in the temporary file to the data set.

17. The method of claim 13, wherein an exclusive lock is held against the data set if another process is accessing the data set to perform the reorganization of the data set, further comprising :
 in response to the access request, waiting for the reorganization of the data set to complete in response to the data set being in the pending uncompleted reorganization state and one other process currently holding the exclusive lock to the data set before completing the access request.

* * * * *